8650X
B. JOHNSON.
Plow.
Patented Feb 20, 1835.
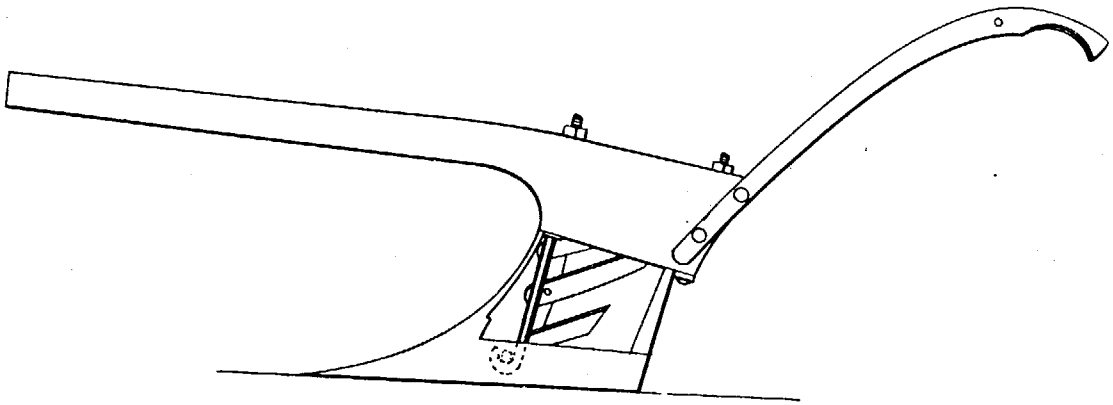
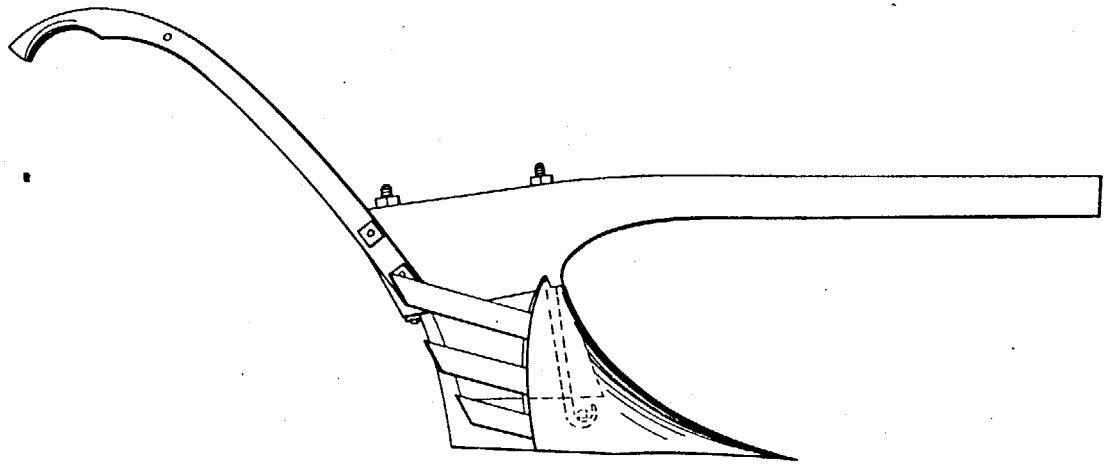

UNITED STATES PATENT OFFICE.

BENJAMIN JOHNSON, OF HICKORY GROVE, ILLINOIS.

IMPROVEMENT IN PLOWS.

Specification forming part of Letters Patent dated February 20, 1835.

*To all whom it may concern:*

Be it known that I, BENJAMIN JOHNSON, of Hickory Grove, in the county of Bond and State of Illinois, have invented a new and useful Improvement in the Carey or Bull Plow; and I do hereby declare that the following is a full and exact description thereof.

Take the common or bull plow-irons, either cast or wrought, which shall be so constructed as that the lower corner of the share behind shall fall a little behind a point parallel with the center of the wing. At the top of the wing make an eye on the common plan an inch and a half deep of a sufficient strength to bear a heavy draft by riveting and welding. The heel of the plow is to extend upward nearly to the same height with the wing, with an eye of the same strength and dimensions formed on the hind part of the said heel at the top. Attach to the under edge of the wing behind, either by riveting-screws, sockets, or eyes and wedges, or by any other sufficient means, three ribs, more or less, these ribs to be made of wood or iron, and to extend behind nearly horizontal, and to be so constructed and arranged as to describe the curve or mold-board; the first rib to project or extend nearly equal to two-thirds of the width of the share, measuring across the bottom, and to be placed on the wing nearly at a point one-third of the distance between the lower corner of the wing and the top of the wing; the top or upper rib to be placed just below the eye at the top of the wing and to extend nearly twice as far back from the share as the first rib; the intermediate ribs to extend so far back that their extreme points shall be, with the extreme points of the bottom and top ribs, nearly on a right line with each other. These ribs are to be sufficiently strong, and from one to two or two and a half inches in width, and the spaces between them, when placed upon the wing, may vary in the same degree.

*The wood-work or stock.*—The beam is to rest upon the two eyes, before described, and, if the irons are not high enough to raise the beam to the proper height, that part of the beam which rests upon the eyes can be increased in thickness or depth by an offset, so as to raise all the beam forward of the eyes to a sufficient height, that part of the beam forward of the first eye to project the usual length, and that part behind the last eye to extend from six to ten inches back of said eye, according to the size of the irons. The beam is secured to the irons by bolts passing up through the eyes and beam and fastened by screws and taps, the handles to be placed one on each side of the beam, and secured by bolts and screws passing through them and the beam. They must spread behind, with a round bar between them in the usual manner.

What I claim as my own invention, and not previously known in the above-described improvement, is the following:

1. The first and most important is in the use of the ribs in place of the common mold-board.

2. The heel of the plow extending up to the wood.

3. The plan of stocking the plow.

The advantages of the first are that the draft is rendered much lighter in consequence of their being less friction, the spaces between the ribs preventing that clogging and accumulation of earth and soil common to the mold-board, and that all or any part of the ribs can be taken off at pleasure and a heavy plow made light, according to the work to be performed. By the second the stock is much simplified and rotting prevented, there being no wood coming in contact with the earth. By the third the cost of the plow with this improvement will be much less than those in common use, it being so simple and of so cheap construction. By this means, also, the pitch of the plow can be regulated in a moment by the screws and bolts passing through the eyes and beam. The durability of the plow, so far as the stock and ribs are concerned, is greatly increased from the fact that all the wood is above ground, and no joints are exposed to receive the water, and thereby occasion rot.

For a complete exemplification of the above reference is made to the model deposited in the Patent Office and the drawing and written references accompanying this application.

In testimony that the above is a true specification of my said improvement, as above described, I have hereunto set my hand this 30th day of December, A. D. 1834.

BENJAMIN JOHNSON.

Witnesses:
JOHN WYATT,
TH. I. V. OWEN.